Oct. 1, 1935.  C. E. HAYS  2,015,675

COLOR AND SHADE COMPARATOR

Filed Feb. 21, 1933 2 Sheets-Sheet 1

Inventor
C. Earl Hays.
By Bryant & Lowry
Attorneys

Oct. 1, 1935.  C. E. HAYS  2,015,675
COLOR AND SHADE COMPARATOR
Filed Feb. 21, 1933   2 Sheets-Sheet 2

Inventor
C. Earl Hays.
By Bryant Lowry
Attorneys

Patented Oct. 1, 1935

2,015,675

UNITED STATES PATENT OFFICE 2,015,675

COLOR AND SHADE COMPARATOR

Clifton Earl Hays, Pawtucket, R. I., assignor of one-third to William W. Orswell, one-sixth to Marcus A. Sutcliffe, Pawtucket, R. I., and one-sixth to Adam A. Sutcliffe, Lincoln, R. I.

Application February 21, 1933, Serial No. 657,916

5 Claims. (Cl. 88—14)

This invention relates to light sensitive devices for determining differences in colors both in relation to their intensities and their position in the spectrum, differences in the intensities in shades, difference in the intensities of illuminating devices, for color analyses and for various other purposes.

More especially the invention relates to devices of this character wherein the various parts are so arranged as to indicate visually on a registering device the variations of intensities of light rays reflected from or passed through a sample or standard specimen and a specimen whose light characteristics are to be compared with the sample or standard specimen.

One important object of the invention is to enable the making of rapid comparisons between color or shade specimens, the comparisons being made with a minimum of effort in adjustment of the device and with a high degree of accuracy.

A second important object of the invention is to enable such color or shade comparisons to be made by persons unskilled in the matching of colors and by persons deficient or abnormal in color sense.

A third important object of the invention is to provide a device of this character which may be used with great accuracy by persons unskilled in handling mechanical and electrical apparatus.

A fourth important object of the invention is to provide a device of this character which has a wide variety of uses among which may be mentioned the comparison of dyed textiles for the purpose of matching tints; matching spools of thread for color or spools of thread with material to be sewed by such thread; the comparison of a fluid with a standard sample or with a clear fluid such as a dye stuff with a standard, a drug extract or chemical with a standard or a raw or treated water with distilled water; for colorimetric chemical analyses; for spectrum analyses of colors; for comparison of weave densities and for many other purposes, such as shape, finish and position of objects.

I am aware that devices for somewhat similar purposes are in existence which employ the use of electrical circuits wherein amplifiers, a plurality of current sources such as batteries and a number of variable resistances. Such devices require much experience in the handling of electrical apparatus and great care in adjustment. Furthermore, such devices are lacking in accuracy because of the impossibility of obtaining constant current conditions from a number of different sources or even from one current source except under circumstances only obtainable in electrical laboratories and which are thus not practicable for unskilled users.

A fifth important object of the invention is to provide a device of this character having electric circuit arrangements which are unamplified and which are free from the necessity of using batteries, generators and the like, the current used being supplied by photo-electric means forming part of the device.

With the above and other objects in view, as will be hereinafter apparent, the invention consists in general of certain circuit arrangements, combinations of parts and organization of details hereinafter fully described in one embodiment of the invention, illustrated in such embodiment in the accompanying drawings, and specifically claimed.

In the accompanying drawings, like characters of reference indicate like parts in the several views, and:—

Figure 1:
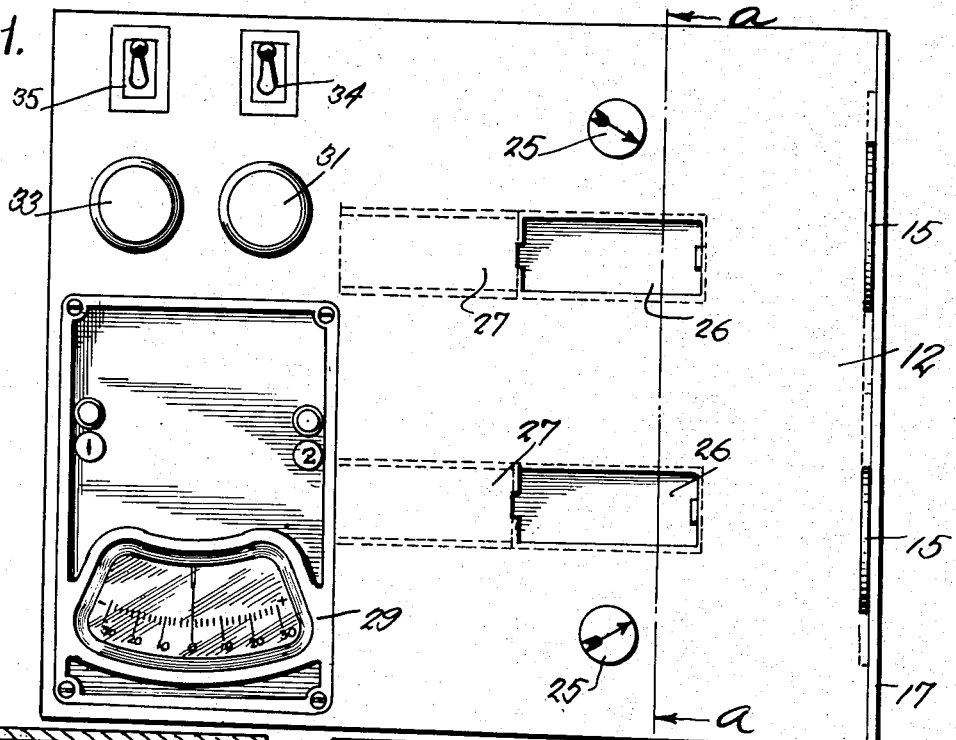
Figure 1 is a plan view of one form of the invention.

The present drawings, which will now be described in detail, show, in Figures 1 to 5 inclusive, one embodiment of the invention but it is to be understood that the invention is not restricted to the particular embodiment mechanically which is here shown as it is capable of being constructed in many other ways beside the specific form illustrated. In this form of the invention there is provided a casing having a bottom 10, side walls 11 and a top 12 which is hinged at one edge to the upper edge of a side wall as by hinges 13. One of the side walls, preferably that on the right of the casing, is provided with a pair of openings or windows 14 of equal size. Disks 15 are mounted for rotation on this side wall and the peripheral portions of these disks extend over the windows 14 and are provided with graduated openings 16 which, by rotation of the disks may be selectively brought into registry with the windows 14. By means of the openings in these disks the effective size of the windows may be regulated and, since corresponding openings in the two disks are equal in area, the effective window areas may be increased or diminished to suit the circumstances and yet may be of equal area with each other.

This feature of the invention corresponds to a well known type of camera diaphragm and it will be obvious that other types of camera diaphragms may be used for this purpose and the invention is not to be restricted to any particular means for regulating the size of the window openings. Hinged to the bottom of the window provided side is a flap or shutter 17 which, when it is turned up, covers the windows and diaphragms or disks 16 and serves to hold specimens in position against the windows.

Figures 2, 3:
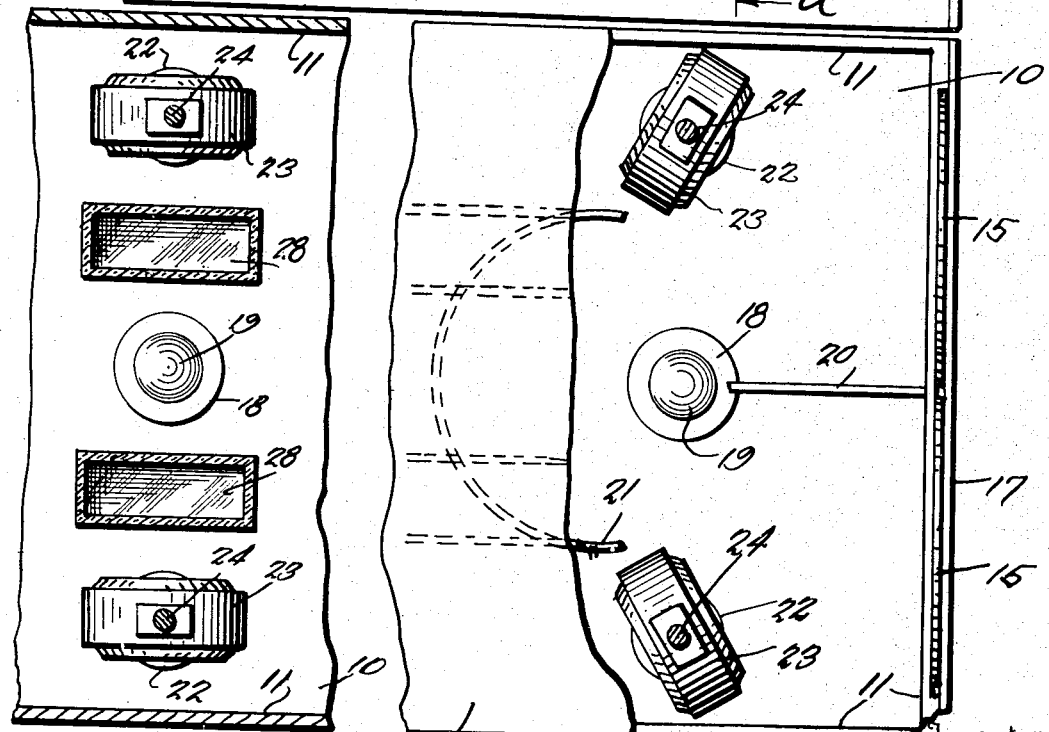
Figure 2 is a detail view partly in plan and partly in horizontal section showing the arrangement of certain parts as used with light reflected from specimens.
Figure 3 is a detail horizontal section showing the arrangement of certain parts for use with light transmitted through specimens.
Figure 4:
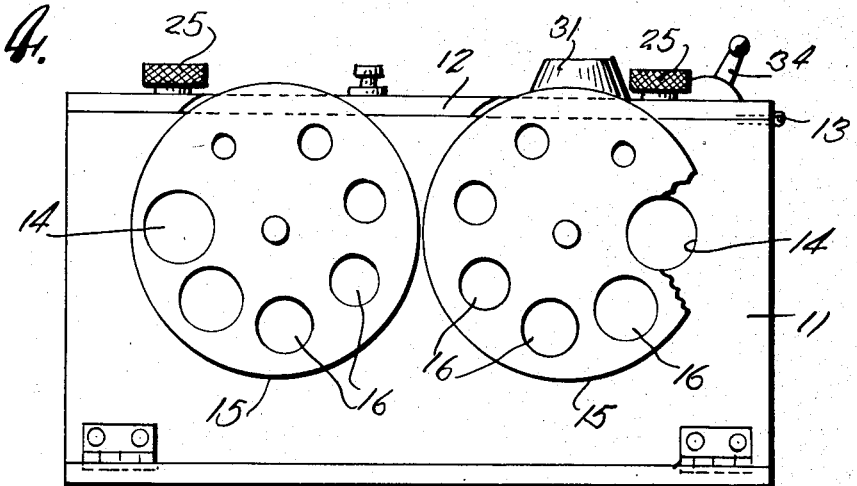
Figure 4 is a side elevation, partly broken away, and showing the right side of the device with the specimen door or flap open.
Figure 5:
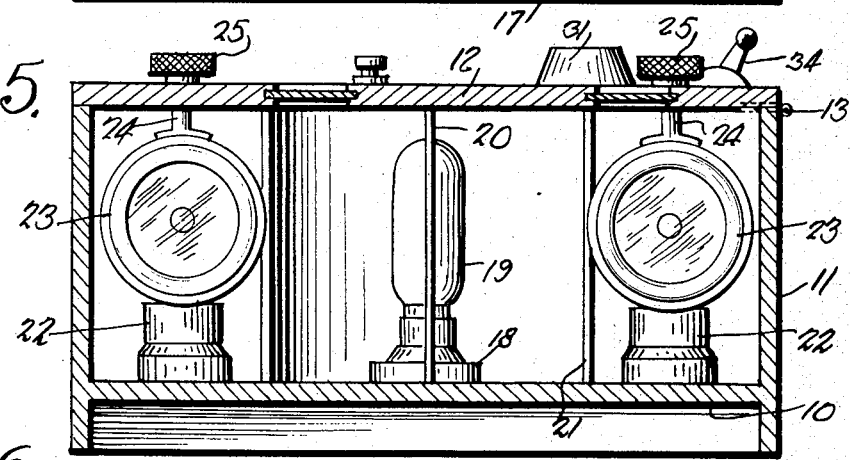
Figure 5 is a section on the line a—a of Figure 1.

Fixed on the floor or bottom 10 of the casing is a lamp socket 18 wherein is a lamp 19 forming a light source. This socket and lamp are equidistant from the two windows so that the specimens positioned against the windows will be equally illuminated. A baffle 20 extends from the window side of the casing nearly to the lamp and a curved baffle 21 is arranged on the side of the lamp away from the windows. A pair of sockets 22 are also arranged on the bottom 10 to receive light sensitive units 23 which are here shown as being of the type known to the trade as the "Photronic" variety. These units are arranged so that the distances between each unit and the adjacent window equal each other and also so that the two units are equidistant from the light source. The sockets are arranged to support the units rotatably on vertical axes and a stem 24 extends up from each unit through a suitable opening in the casing top and is provided with a pointer provided turn button 25 above the top so that the positions of the units may be adjusted to enable them to face the respective windows or the lamp as may be desired. In the top 12 are provided a pair of rectangular openings 26 which may be closed in a light tight manner by slides 27 or other suitable closures. Liquid holding cells or tanks 28 are arranged to be inserted through these openings and are held suspended in alinement between the lamp 19 and the respective units 23. These tanks are equidistant from the light source. The arrangement of the parts when the tanks are in use is shown in Figure 3.

Mounted in the casing with its face substantially flush with the top 12 is an electrical measuring instrument which is preferably a differential microammeter 29 and thus is very sensitive to current flow. The zero point of the scale of this instrument is in the center of the scale and, when properly adjusted, the pointer rests over the zero point when no current flows through the instrument. A potentiometer 30 (shown only in Figures 6 and 7) is mounted in the casing and has its movable contact operated by a knob 31 located on top of the casing. There is also provided a variable resistance 32 (see Figure 6) mounted in the casing and controlled by a knob 33 on top of said casing. The casing also carries a light unit circuit switch 34 and a lamp circuit switch 35.

Figure 6:
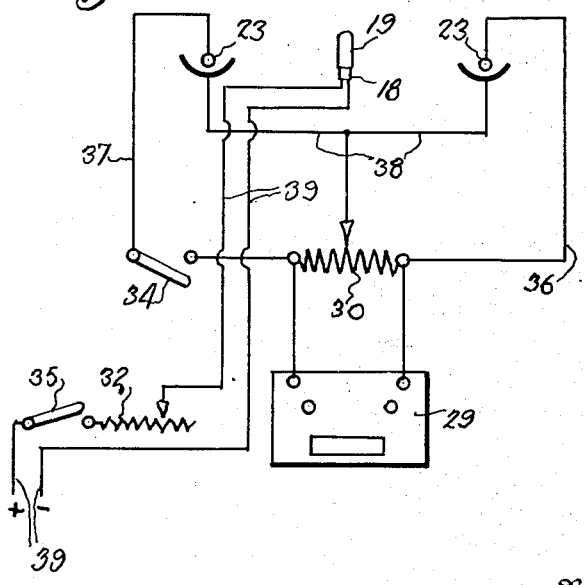
Figure 6 is a wiring diagram showing one form of wiring used with this device.
Figure 7:
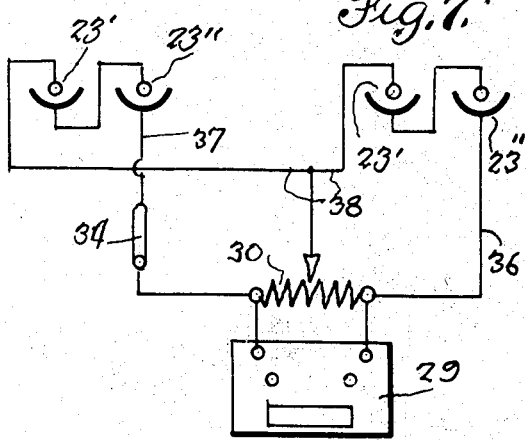
Figure 7 is a wiring diagram showing a modified form of the invention and the diagram wiring therefor.

Considering now the wiring diagrams in Figures 6 and 7. In Figure 6 is shown a circuit arrangement wherein the units 23 are arranged in parallel. In this arrangement a wire 36 leads from one terminal of a unit 23 to one terminal of the instrument 29 and a wire 37 connects the like terminal of the remaining unit 23 to the remaining terminal of the instrument 29 through the switch 34. The resistance of the potentiometer 30 bridges across the wires 36 and 37, being connected to the wire 37 between the switch 34 and the instrument 29. The opposite terminals of the units 23 are connected in multiple by wiring 38 with the movable contact of the potentiometer. From any suitable source of electric current such as a house circuit battery or the like wires 39 lead to the socket 18, the switch 35 and variable resistance 32 being arranged in these wires to control the lamp circuit.

The form shown in Figure 7 is practically the same as that shown in Figure 6 except that each light sensitive unit of Figure 6 is replaced by a pair of such units 23' and 23" connected in series.

Obviously all parts within the casing will be finished in a dull mat black to avoid all light reflections which might interfere with the operation of the device.

Certain concrete examples of the use of the invention will now be given but it is to be understood that the examples mentioned are but a few of the many uses to which the invention may be put.

In using the device to determine whether or not certain fabrics match in color the diaphragms are adjusted so that the available samples of the materials to be compared will entirely cover the effective window openings. The two window openings are of course to be of equal area. The shutter 17 is closed and the potentiometer 30 is adjusted until the circuits through the respective units 23 are balanced and the pointer thus be brought to zero on the scale of the ammeter. The two specimens are then placed over the windows by opening the shutter, positioning the specimens and closing the shutter. If the two are of exactly the same color and shade the lamp, which is of course turned on, will have its rays reflected equally from the specimens so that the reflected rays will act equally on the two units. Since these units form the sole sources of power in the test circuit they will exert like effect in opposite directions on the circuit so that the effect of the units on the ammeter will be nil and the pointer will remain at zero. If, however, one specimen be of different color or shade than the other the pointer of the ammeter will move to the side connected to that unit which is affected by the lighter shade. It will be obvious that this test depends neither on the intensity of illumination nor on the accuracy of the human eye in color selectivity or comparison. This is of great advantage since the most accurate eyes tire and become inaccurate after a comparatively short time. Also, one does not need north day light in making the tests as is necessary in matching or color determinations by eye.

A second method of making such determinations may be effected by opening the switch 34 which cuts out one unit 23. After balancing the ammeter by the potentiometer the two samples are exposed in succession at the lit window and the relative deflections of the ammeter needle noted. Obviously, the specimen of lighter shade will cause the greater deflection of the needle.

In determining color identity or lack of identity in liquids such, for example, as dye stuff solutions, a standard solution may be placed in one tank 28 and the solution to be compared in the other tank. The tanks are then placed in position through the slots or openings 26, the ammeter having been previously balanced with the units 23 turned to face the light. The solution containing the least dye stuff will of course permit the passage of the most light and the ammeter pointer will be accordingly deflected to one side or the other. If a single dye stuff, such as Violamin R, Acid Green or the like be used it is then merely necessary to increase as the case requires the dye stuff content of the bath being compared until the pointer of the ammeter remains at zero. Then the two dye stuffs will match. If, however, the dye stuff solution contains several dye stuffs of different colors, say a blue, a red and a yellow dye stuff, by the use of standard color filters the standard specimen and that to be compared therewith may each be analyzed and the color deficiency of the compared specimen be brought up to standard by the addition of a dye stuff or a plurality of dye stuffs in which the tested bath is deficient.

The ammeter readings may, by the use of known standards be calibrated in tabular form so that intensity of shade differences may be quickly determined if desired. For instance, samples of water each having a known degree of turbidity may be compared with distilled water and the deflection of the needle for each sample be noted on the ammeter scale and tabulated. Suppose, for instance that a sample having a known turbidity caused by 5 parts of matter in suspension is found to cause a deflection of 4 scale graduations of the ammeter pointer, there any specimens of water tested which gives this same deflection will have the same content of matter in suspension.

Many other uses for the device will readily occur to those skilled in various arts but it is not deemed necessary here to multiply examples of the usage of the invention as it is believed that the foregoing are sufficient to enable any person to utilize the same.

There has thus been provided a simple and efficient device of the kind described and for the purposes specified.

It is obvious that many changes may be made in the form, construction and wiring arrangements of the invention without in any way departing from the material principles thereof. It is not, therefore, desired to confine the invention to the exact form herein shown and described but it is desired to include all forms which come within the scope of the appended claims.

I claim:—

1. In means for comparing color and shade characteristics of a plurality of specimens, a pair of balanced light actuated electric current producing units adapted to be energized by light from respective specimens, a differential micro-ammeter, circuit connections from like terminals of respective units to opposite sides of said ammeter, a potentiometer having its resistance bridged across said circuit connections, other circuit connections from the remaining terminals of the units to the movable contact of said potentiometer, a light tight casing enclosing said units and provided with windows and means to cover the windows and hold specimens thereagainst, the respective windows being equally spaced from respective units, a lamp within the casing spaced equally from said windows, and from said units, and other means spaced equally from said lamp and located between the lamp and respective units to support translucent specimens, said units being mounted to revolve on their axes to selectively face the windows and last mentioned means.

2. In means for comparing color and shade characteristics of a plurality of specimens, a pair of balanced light actuated electric current producing units adapted to be energized by light from respective specimens, a differential micro-ammeter, circuit connections from like terminals of respective units to opposite sides of said ammeter, a potentiometer having its resistance bridged across said circuit connections, other circuit connections from the remaining terminals of the units to the movable contact of said potentiometer, a light tight casing enclosing said units and provided with windows, said casing having means to vary the effective size of said windows, and means to cover the windows and hold specimens thereagainst, the respective windows being equally spaced from respective units, and a lamp within the casing spaced equally from said windows.

3. In means for comparing color and shade characteristics of a plurality of specimens, a pair of balanced light actuated electric current producing units adapted to be energized by light from respective specimens, a differential micro-ammeter, circuit connections from like terminals of respective units to opposite sides of said ammeter, a potentiometer having its resistance bridged across said circuit connections, other circuit connections from the remaining terminals of the units to the movable contact of said potentiometer, a light tight casing enclosing said units and provided with windows, said casing having means to vary the effective size of said windows, and means to cover the windows and hold specimens thereagainst, the respective windows being equally spaced from respective units, a lamp within the casing spaced equally from said windows, and from said units, and other means spaced equally from said lamp and located between the lamp and respective units to support translucent specimens, said units being mounted to revolve on their axes to selectively face the windows and last mentioned means.

4. In means for comparing color and shade characteristics of a plurality of specimens, a pair of light actuated current producing units adapted to be energized by light from respective specimens, means to indicate the difference in excitation of said units, a light tight casing enclosing said units and provided with windows and means to cover said windows and hold specimens thereagainst, a lamp within the casing positioned to equally illuminate specimens held against said windows, means to support translucent specimens between said lamp and the respective units, and mountings for said units arranged to permit rotation of the units on their axes to selectively face the windows and the last mentioned means.

5. In means for comparing color and shade characteristics of a plurality of specimens, a pair of light actuated current producing units adapted to be energized by light from respective specimens, means to indicate the difference in excitation of said units, a light tight casing enclosing said units and provided with windows and means to cover said windows and hold specimens thereagainst, a lamp within the casing positioned to equally illuminate specimens held against said windows, means to support translucent specimens between said lamp and the respective units, and mountings for said units arranged to permit rotation of the units on their axes to selectively face the window and the last mentioned means, said units being spaced equally from respective windows and being also spaced equally from the respective means to support translucent specimens.

C. EARL HAYS.